US008775015B2

(12) United States Patent
Lai

(10) Patent No.: US 8,775,015 B2

(45) Date of Patent: Jul. 8, 2014

(54) VEHICLE COLLISION EVENT ANNOUNCING SYSTEM AND METHOD

(75) Inventor: Kaung-Lin Lai, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/619,304

(22) Filed: Sep. 14, 2012

(65) Prior Publication Data

US 2014/0025252 A1 Jan. 23, 2014

(30) Foreign Application Priority Data

Jul. 20, 2012 (TW) ............................ 101126162 A

(51) Int. Cl.

*G01M 17/00* (2006.01)
*G06F 7/00* (2006.01)
*G06F 19/00* (2011.01)

(52) U.S. Cl.

USPC .......................... 701/32.4; 701/32.2; 382/104

(58) Field of Classification Search

CPC ... B60R 2300/108; H04N 5/232; G06Q 40/08
USPC ................................ 701/32.4, 32.2; 382/104
See application file for complete search history.

(56) References Cited

U.S. PATENT DOCUMENTS

| | | | | |
|---|---|---|---|---|
| 5,311,197 A * | 5/1994 | Sorden et al. | 342/457 |
| 5,388,048 A * | 2/1995 | Yavnayi et al. | 701/301 |
| 5,559,697 A * | 9/1996 | Wang | 701/45 |
| 6,487,500 B2 * | 11/2002 | Lemelson et al. | 701/301 |
| 7,143,856 B2 * | 12/2006 | Takahashi et al. | 180/274 |
| 7,676,306 B2 * | 3/2010 | Kubo et al. | 701/32.3 |
| 7,889,931 B2 * | 2/2011 | Webb et al. | 382/209 |
| 8,412,448 B2 * | 4/2013 | Lee et al. | 701/301 |
| 8,423,235 B2 * | 4/2013 | Lee | 701/31.4 |
| 2010/0079267 A1 * | 4/2010 | Lin | 340/435 |
| 2011/0060496 A1 * | 3/2011 | Nielsen et al. | 701/33 |
| 2011/0066317 A1 * | 3/2011 | Lee | 701/33 |
| 2011/0210835 A1 * | 9/2011 | Kondo | 340/425.5 |
| 2013/0129150 A1 * | 5/2013 | Saito | 382/104 |

FOREIGN PATENT DOCUMENTS

| | | |
|---|---|---|
| EP | 1386800 A2 | 2/2004 |
| TW | 593024 | 6/2004 |
| TW | I306066 | 2/2009 |
| TW | 201105995 A1 | 2/2011 |

(Continued)

OTHER PUBLICATIONS

Lin, Yuan-Fu et al., "An Analysis of Rear-End Collisions of Vehicles," The 30th National Conference on Theoretical and Applied Mechanics, Dec. 15-16, 1995, 22 pages, Taiwan, R.O.C.

Taiwan Patent Office, Office Action, Patent Application Serial No. 101126162, May 9, 2014, Taiwan.

(Continued)

*Primary Examiner* — Fadey Jabr
*Assistant Examiner* — Paula L Schneider

(57) ABSTRACT

A vehicle collision event announcing system is provided. The system includes: a processor; an image capturing unit, coupled to the processor, for capturing vehicle images from at least a part of the vehicle; a collision sensing unit, for detecting whether the vehicle is running into a probable collision event; and a feature image comparison unit, coupled to the processor, for when the collision sensing unit detects the probable collision event, comparing the vehicle images before and after the probable collision event to determine whether the probable collision event is a real collision event which causes damage to the vehicle and/or the seriousness of the damage of the real collision event.

20 Claims, 5 Drawing Sheets

(56) References Cited

FOREIGN PATENT DOCUMENTS

| | | | |
|---|---|---|---|
| TW | M405994 | U1 | 6/2011 |
| TW | M407857 | | 7/2011 |
| TW | 201219789 | A1 | 5/2012 |

OTHER PUBLICATIONS

NCAC Finite Element Model of Dodge Neon 1996, Jun. 30, 2006, 12 pages, The George Washington Unversity, US.

* cited by examiner

VEHICLE COLLISION EVENT ANNOUNCING SYSTEM AND METHOD

CROSS REFERENCE TO RELATED APPLICATIONS

This Non-provisional application claims priority under 35 U.S.C. §119(a) on Patent Application No(s). 101126162, filed in Taiwan, Republic of China on Jul. 20, 2012, the entire contents of which are hereby incorporated by reference.

BACKGROUND OF THE INVENTION

1. Field of the Invention

The present invention relates to technology for automatically announcing a vehicle collision event.

2. Description of the Related Art

When a traffic accident occurs, drivers or passengers are sometimes unable to ask for help due to serious injury or unconsciousness, thus delaying rescue efforts. To prevent this kind of tragedy, collision sensors are sometimes configured in a vehicle in the prior art so as to announce a collision event and ask for help from the public when the force of the collision experienced by the vehicle reaches a predetermined value.

However, the collision sensors are not always reliable. The force of the collision may come from all directions in an accident, but the collision sensor may merely deal with those from certain directions. Therefore, in some cases, the force of the collision is not sufficient to turn on the announcement system even though the accident is deadly serious. In some cases, braking forces and some centrifugal forces which occur when steering the vehicle may make the collision sensors consider there was an accident and issue a wrong notification. In addition, when the accident is not that serious and can be easily handled, it is necessary to issue any notification. Unnecessary notifications not only wastes social resources but also may get the one who announces them into troubles.

Therefore, a more reliable vehicle collision event announcement system is needed.

BRIEF SUMMARY OF THE INVENTION

The present invention provides a vehicle collision event announcing system. The system comprises: a processor; an image capturing unit, coupled to the processor, for capturing vehicle images from at least a part of the vehicle; a collision sensing unit, for detecting whether the vehicle is running into a probable collision event; and a feature image comparison unit, coupled to the processor, for when collision sensing unit detects the probable collision event, comparing the vehicle images before and after the probable collision event to determine whether the probable collision event is a real collision event which causes damage to the vehicle and/or the seriousness of the damage of the real collision event.

The present invention also provides a vehicle collision event announcing system. The system comprises: a near-end portion, comprising: a first processor; an image capturing unit, coupled to the first processor, for capturing vehicle images from at least a part of the vehicle; and a collision sensing unit, for detecting whether the vehicle is running into a probable collision event; a far-end portion, wirelessly coupled to the near-end portion, comprising: a second processor; and a feature image comparison unit, coupled to the second processor, for when collision sensing unit detects the probable collision event, comparing the vehicle images before and after the probable collision event to determine whether the probable collision event is a real collision event which has damage on the vehicle and/or the seriousness of the damage of the real collision event.

The present invention also provides a vehicle collision event announcing method. The method comprises: capturing vehicle images from at least a part of the vehicle by an image capturing unit; detecting whether the vehicle is running into a probable collision event by a collision sensing unit; when collision sensing unit detects the probable collision event, comparing the vehicle images before and after the probable collision event to determine whether the probable collision event is a real collision event which has damage on the vehicle and/or the seriousness of the damage of the real collision event.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Vehicle Collision Event Announcing System

Figure 1:
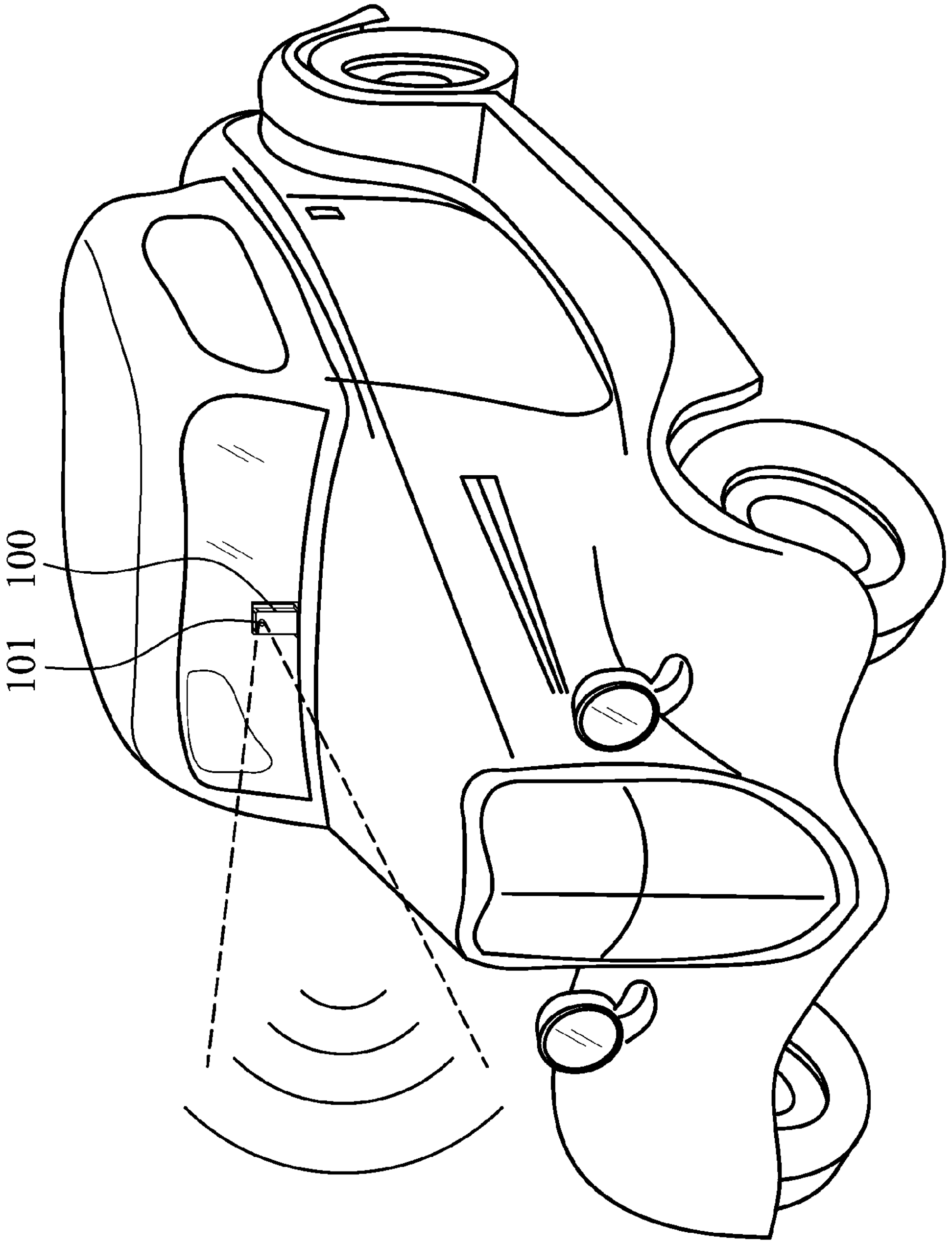
FIG. 1 is a schematic diagram of the vehicle collision event announcing system according to an embodiment of the present invention.

The vehicle collision event announcing system of the present invention may be manufactured as a device that operates independently, or integrated into other electronic vehicle devices such as a navigating device and an event data recorder (EDR). In some embodiments, the vehicle collision event announcing system of the present invention is an application module and can be integrated with a mobile device such as mobile phone. FIG. 1 is a schematic diagram of the vehicle collision event announcing system according to an embodiment of the present invention. As shown in FIG. 1, the vehicle collision event announcing system 100 has a phone appearance, and can be disposed on the vehicle between the windshield and the driver's seat (like an event data recorder) having a lens 101 facing the road and the front part of the vehicle body. Note that the vehicle collision event announcing system 100 of the present invention in FIG. 1 is merely for illustration, the present invention should not be limited thereto. Thus, in other embodiments, user can dispose the system 100 in any proper position (for example, with a lens 101 facing the rear part of the vehicle body).

Figure 2:
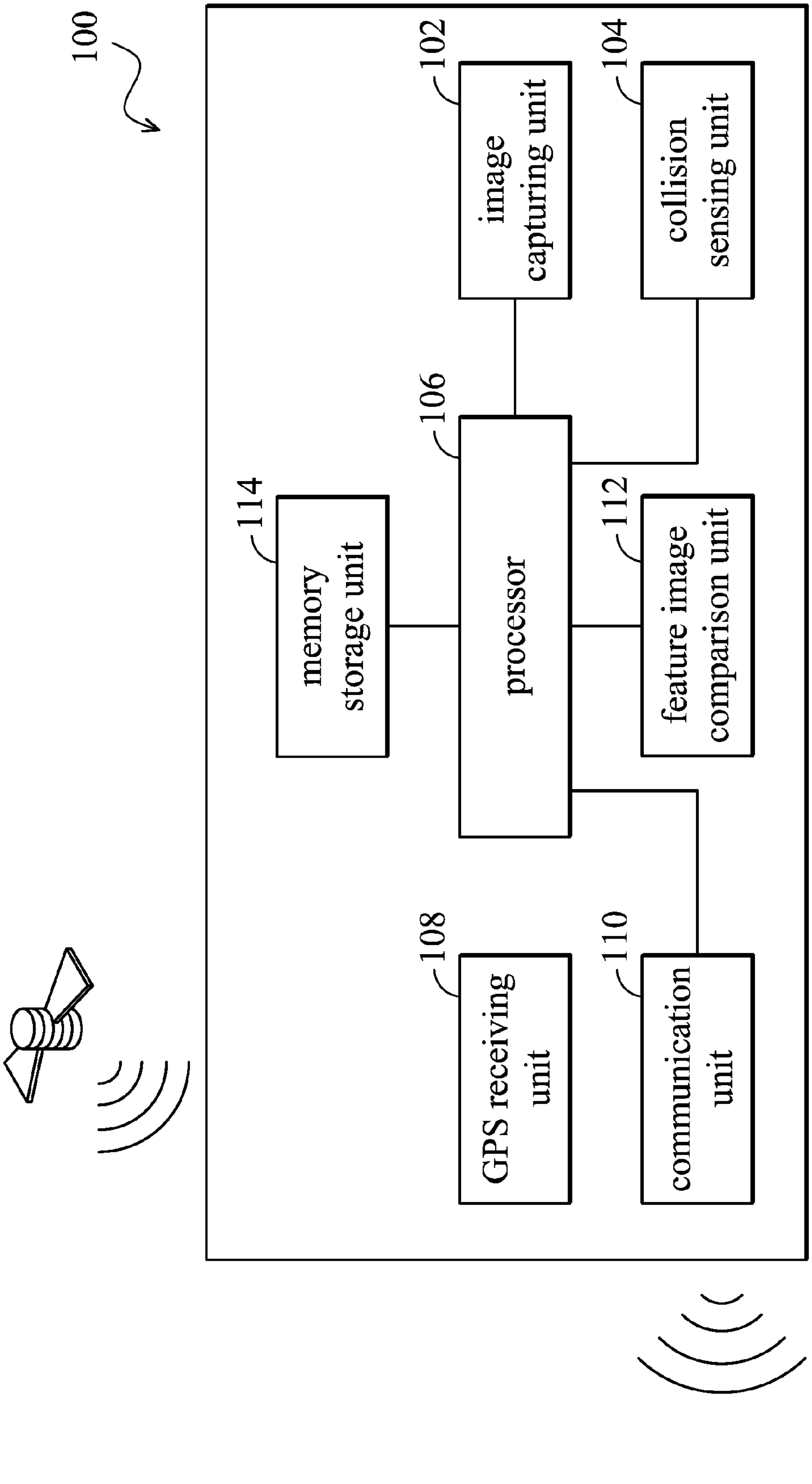
FIG. 2 is a schematic diagram of the components of the vehicle collision event announcing system 100 of FIG. 1.

FIG. 2 is a schematic diagram of the components of the vehicle collision event announcing system 100 of FIG. 1. The vehicle collision event announcing system 100 of the present invention comprises: an image capturing unit 102, a collision sensing unit 104, a processor 106, a feature image comparison unit 112, a memory storage unit 114, a global positioning system (GPS) receiving unit 108 and a communication unit 110.

The image capturing unit 102 of the present invention has an appearance of the lens 101 in FIG. 1. The image capturing unit 102 can be used to capture vehicle images from a designated part of the vehicle. In this embodiment, image capturing unit 102 is used to capture the vehicle image of the front part of the vehicle. In some embodiments, the image capturing unit 102 can capture a vehicle image in advance at the time when the setting of the vehicle collision event announcing system 100 is done, where the captured vehicle image can be stored in the memory storage unit 114 and deemed as a "standard vehicle image", which will be described latter. In other embodiments, the image capturing unit 102 can concurrently serve as an event data recorder for monitoring road and the vehicle's front part all the time, and let one of the vehicle images captured at a proper time before the collision event as the standard vehicle image.

The collision sensing unit 104 of the present invention can be used for detecting whether the vehicle is running into a probable collision event. For example, the collision sensing unit 104 can be an accelerometer or a gravity sensor (G-Sensor), and is used for detecting whether the vehicle is running into a probable collision event by detecting the variation of the acceleration (or the G-value) from all directions of the vehicle and determining whether the variation is greater than a predetermined range. In a preferred embodiment, the collision sensing unit 104 should detect the force of the collision in all dimensions without leaving out any information. In some embodiments, the collision sensing unit 104, coupled to the processor 106, can trigger the image capturing unit 102 (through the processor 106) to capture images of the vehicle before and after the probable collision event. In this disclosure, the number of vehicle images captured during the collision event should not be limited, and those skilled in the art can set and adjust the frame rates for capturing the vehicle images.

In this embodiment, the feature image comparison unit 112 of the present invention is coupled to the collision sensing unit 104 and image capturing unit 102 via the processor 106. When the collision sensing unit 102 detects a probable collision event, the feature image comparison unit 112 performs a comparison procedure on the images captured by the image capturing unit 102 to determine if this probable collision event is a real collision event which causes damage to the vehicle, and, if yes, the seriousness of the damage of the real collision event. Specifically, in an embodiment, when the probable collision event occurs, the collision sensing unit 104 can trigger the image capturing unit 102 (through the processor 106) to capture the vehicle images during the probable collision event. Then, the image capturing unit 102 transmits the captured vehicle images to the registers of the processor 106 (or the memory storage unit 114), and the feature image comparison unit 112 compares the features of the vehicle images captured during the probable collision event with those of the standard vehicle image stored in the memory storage unit 114, in order to determine if there is any deformation of the vehicle body after the probable collision event. If yes, the feature image comparison unit 112 determines that the probable collision event is a real collision event, and the deformation can be regarded as the seriousness of the damage of the real collision event. Note that, since the vehicle may travel in a variety of environments, the feature image comparison unit 112 may perform proper procedures to filter (or delete) the background of the vehicle from the vehicle images, and to adjust (or neglect) the color and brightness variations on the vehicle body due to the environment light sources (for example, in a gray-scale manner). Since the various filtering and adjusting techniques which can be seen in many image identification products and patents are not the main subject matter of the present invention, they will not be further discussed in the present disclosure. The feature image comparison unit 112 can be software, firmware or hardware, and, in some embodiments, can be integrated with the processor 106.

The communication unit 110 of the present invention is coupled to the processor 106. When the processor 106 determines that there is a real collision event or that the seriousness of the damage of the real collision event (e.g., the degree of deformation) reaches a predetermined value, the communication unit 110 automatically announces far-ends a "real collision event message", where the term "far-ends" refers, for example, to police units, fire units, medical units, road monitoring centers for the vehicle, insurance companies, the driver's designated contact person, or other such locations. Note that the predetermined value of the seriousness should not be limited and can be properly set based on vehicle-related test data according to the spirit of the present invention. The global positioning system (GPS) receiving unit 108 of the present invention is coupled to the processor 106. The GPS coordinates of the vehicle collision event announcing system 100 (i.e., the GPS coordinates of the vehicle) can be received by the GPS receiving unit 108, and can be contained in the collision event message sent by the communication unit 110. It is advantageous for first-responder units to be informed quickly where the collision event occurred.

From the embodiments described above, it can be seen that, through the use of the image capturing unit 102 and the feature image comparison unit 112, the vehicle collision event announcing system 300 can not only confirm that the detected probable collision event is a real collision event (which caused real damage to the vehicle), but also to estimate the degree of damage, thus preventing the vehicle collision event announcing system 100 from sending unnecessary messages which may cause trouble for rescue units or drivers.

Figure 3:
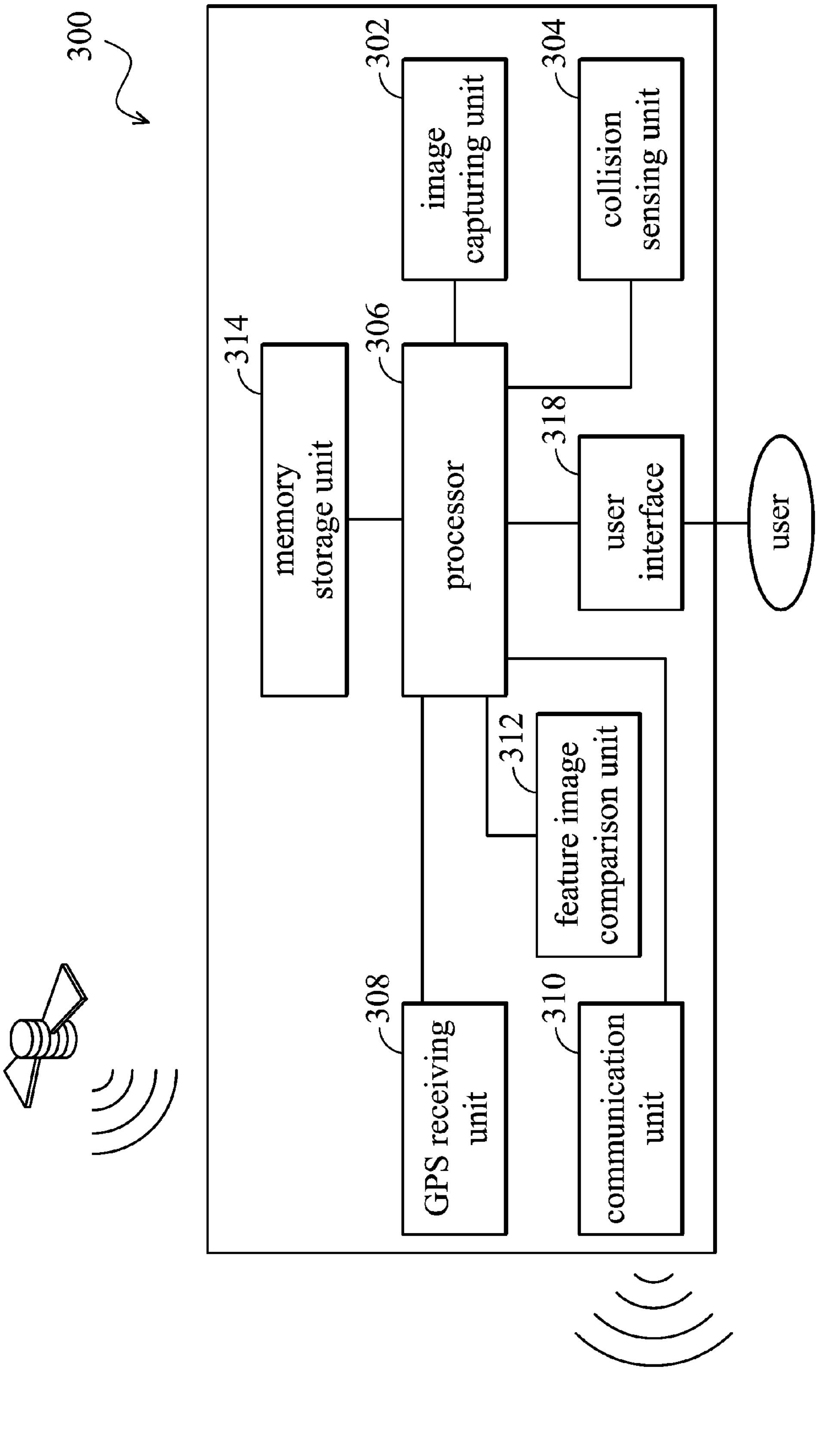
FIG. 3 is a schematic diagram of the components of vehicle collision event announcing system 300 according to another embodiment of the present invention.

FIG. 3 is a schematic diagram of the components of vehicle collision event announcing system 300 according to another embodiment of the present invention. Similarly, the vehicle collision event announcing system 300 in this embodiment also comprises an image capturing unit 302, a collision sensing unit 304, a processor 306, a feature image comparison unit 312, a memory storage unit 314, a GPS receiving unit 308, and a communication unit 310. However, unlike the previous embodiments, the vehicle collision event announcing system 300 further comprises a user interface 318. The user interface 318 comprises an output module and an input module, where the output module can be a display (for example, a liquid-crystal display), a loudspeaker, or the like; and the input module can be a keyboard, a microphone, or the like. The output module and the input module can be integrated into a single device, such as a touch display. The user interface 318 is coupled to the processor 106, and can be used for sending an inquiry message to a user (for example, via a display), after the collision sensing unit 104 detects the real collision event and before the communication unit 110 announces the real collision event message, to confirm that the real collision event message should be announced. When the user answers yes to the inquiry message (for example, via the input module), or when the user fails to confirm the inquiry message within a predetermined time, the user interface 318 can cause the communication unit 110 to announce the real collision event message, thus aiding in the timely rescue of the user despite serious injury or unconsciousness. Otherwise, when the user answers no to the inquiry message, the user interface 318 can cause the communication unit 110 to cancel or delay the sending of the real collision event message. The user interface 112 of the present invention provides another way for the user to check if the collision sensing unit 104 has made an incorrect judgment and to express if he really needs help, thus preventing the vehicle collision event announcing system 300 from sending unnecessary messages.

Figure 4:
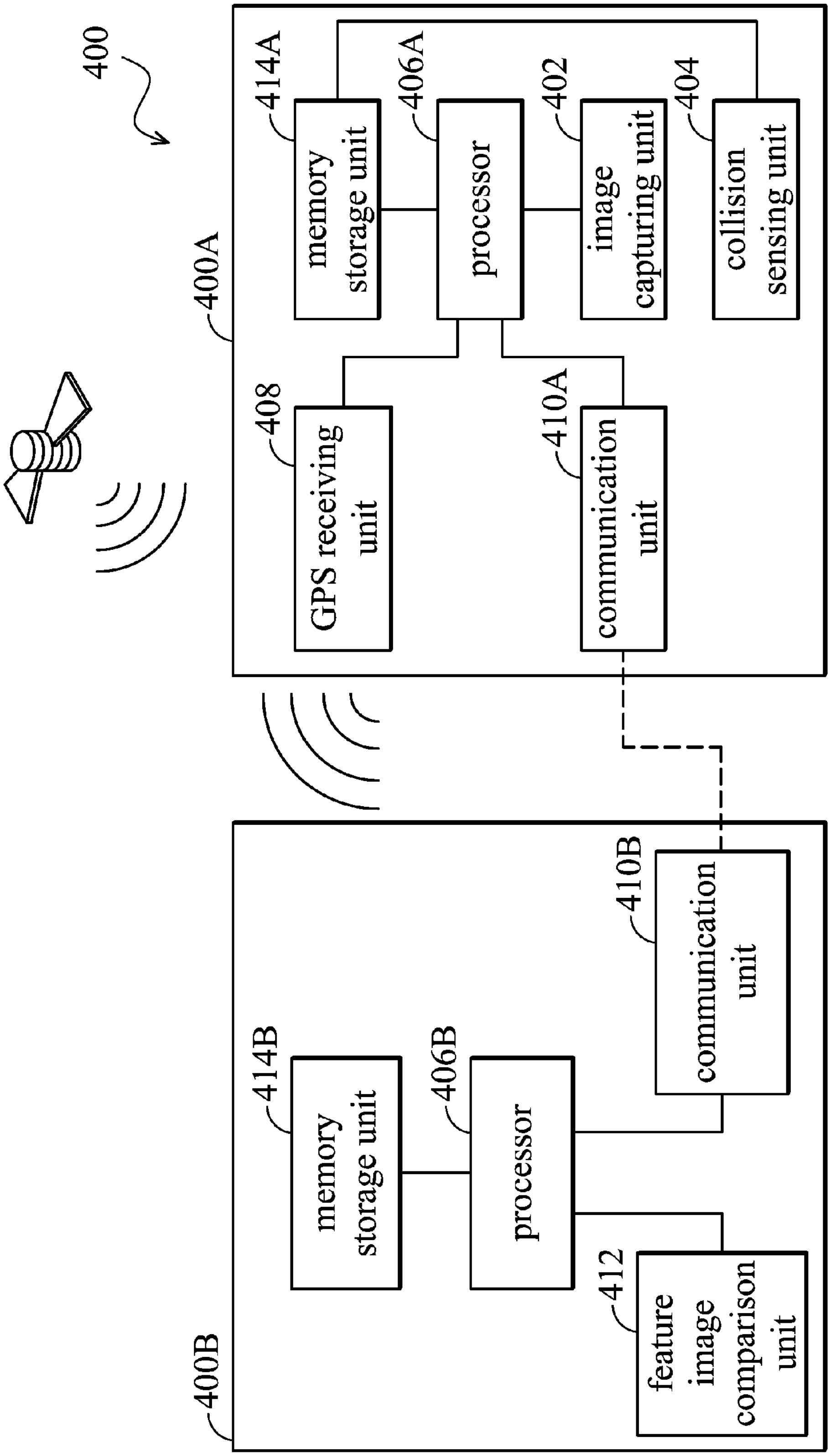
FIG. 4 is a schematic diagram of the components of vehicle collision event announcing system 400 according to another embodiment of the present invention.

In the previous embodiment, the components of the vehicle collision event announcing system of the present invention are integrated into a single device. However, in some embodiments, those components can be separated from each other and disposed in different places in the vehicle; and in some embodiments, some of the components can be disposed outside the vehicle. FIG. 4 is a schematic diagram of the components of the vehicle collision event announcing system 400 according to another embodiment of the present invention. In this embodiment, the vehicle collision event announcing system 400 can be divided into a near-end portion 400A and a far-end portion 400B. For example, the near-end portion 400A is disposed inside the vehicle, and the far-end portion 400B is disposed in a cloud server outside the vehicle and can communicate with the near-end portion 400A in a wireless manner. Similarly to the embodiments described above, the near-end portion 400A of the vehicle collision event announcing system 400 comprises: an image capturing unit 402, a collision sensing unit 404, a processor 406A, a memory storage unit 414A, a GPS receiving unit 408, and communication unit 410A; and the far-end portion 400B comprises a feature image comparison unit 412, another processor 406B, another memory storage unit 414B, and another communication unit 410B. The communication unit 410A of the near-end portion 400A can communicate with the communication unit 410B of the far-end portion 400B, and the communication unit 410B can receive vehicle image data from the communication unit 410A, and send a comparison result made by the feature image comparison unit 412 back to the communication unit 410A. The memory storage units 414A and 414B can store data and messages. For example, the memory storage unit 414A of the near-end portion 400A can store the images captured by the image capturing unit 402. The feature image comparison unit 412 can be used to perform, under the control of the processor 406B, the image feature comparison procedure which has been described in the previous embodiments. The feature image comparison unit 412 is the most resource-consuming component. Therefore, by disposing the feature image comparison unit 412 in the far-end portion 400B and separating it from the other components of the near-end portion 400A, the system requirements for the vehicle collision event announcing system 400 in the near-end portion 400A can be greatly reduced, making it possible for the vehicle collision event announcing system 400 to be integrated into a mobile device.

Vehicle Collision Event Announcing Method

Figure 5:
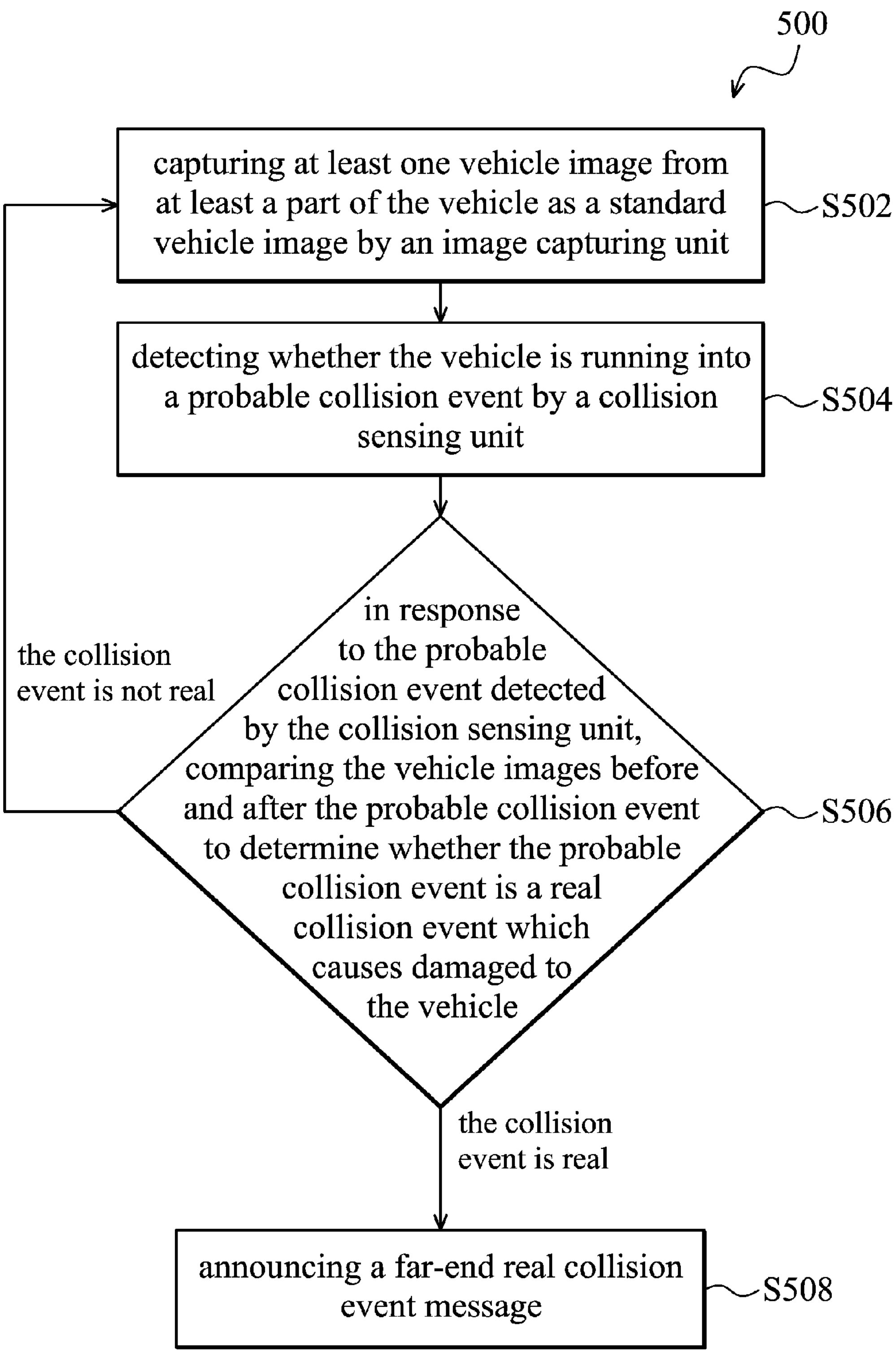
FIG. 5 is a flow chart of the vehicle collision event announcing method according to an embodiment of the present invention.

In addition to the vehicle collision event announcing system, the present invention also provides a vehicle collision event announcing method. FIG. 5 is a flow chart of the vehicle collision event announcing method according to an embodiment of the present invention. The method 500 comprises: in step S502, capturing vehicle images from at least a part of the vehicle as a standard vehicle image by an image capturing unit; in step S504, detecting whether the vehicle is running into a probable collision event by a collision sensing unit; in step S506, when the collision sensing unit detects the probable collision event, comparing the vehicle images before and after the probable collision event to determine whether the probable collision event is a real collision event which has done damage to the vehicle and/or the seriousness of the damage of the real collision event; in step S508, when determining that the probable collision event is a real collision event or when the seriousness of the damage reaches a predetermined value, announcing a far-end real collision event message; and repeating steps S502-S504 when the probable collision event is not a real collision event or when the seriousness of the damage does not reach the predetermined value.

The standard vehicle image may be an image captured by the image capturing unit at the time when the installation of the vehicle collision event announcing system is done, or at any time before the collision event occurs. In a preferred embodiment, the real collision event message in step S508 comprises GPS coordinates which indicate the location of the vehicle. In addition, the present invention may optionally include the steps of: sending an inquiry message to the user after the collision sensing unit 104 detects the real collision event and before the communication unit 110 announces the real collision event message (i.e., between steps S506 and S508), to confirm that the real collision event message should be announced; announcing the real collision event message when the user answers yes to the inquiry message or when the user fails to confirm the inquiry message within a predetermined time; and canceling or pausing the sending of the real collision event message when the user answers no to the inquiry message. Those skilled in the art can embody the vehicle collision event announcing method of the present invention by referring to the previous embodiments of the vehicle collision event announcing systems 100, 300 and 400, therefore the other embodiments of the vehicle collision event announcing method will not be further discussed.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A vehicle collision event announcing system, comprising:

a processor;

an image capturing unit, coupled to the processor, configured to capture images from at least a part of a vehicle;

a collision sensing unit, configured to detect a probable collision event involving the vehicle; and a feature image comparison unit, coupled to the processor, configured to compare an image captured before the probable collision event and an image captured after the probable collision event in response to detection of the probable collision event by the collision sensing unit, and to determine accordingly whether the probable collision event is a real collision event in which damage comprising deformation is caused to the vehicle.

2. The vehicle collision event announcing system as claimed in claim 1, further comprising:

a communication unit, coupled to the processor, configured to announce a far-end real collision event message when the processor determines that the probable collision event is a real collision event and/or the seriousness of the damage reaches a predetermined value.

3. The vehicle collision event announcing system as claimed in claim 2, further comprising:

a global positioning system (GPS) receiving unit, coupled to the processor, configured to receive GPS coordinates of the vehicle collision event announcing system.

4. The vehicle collision event announcing system as claimed in claim 3, wherein the real collision event message announced by the communication unit comprises the GPS coordinates.

5. The vehicle collision event announcing system as claimed in claim 1, wherein the collision sensing unit is coupled to the processor, configured such that the image capturing unit captures the vehicle images when the probable collision event is detected.

6. The vehicle collision event announcing system as claimed in claim 1, further comprising:

a memory storage unit, configured to store the vehicle images captured by the image capturing unit, wherein the feature image comparison unit operates based on the vehicle images stored in the memory storage unit.

7. The vehicle collision event announcing system as claimed in claim 1, wherein the image capturing unit is configured to capture a vehicle image of at least a part of the vehicle as a standard vehicle image before the collision sensing unit detects a probable collision event.

8. The vehicle collision event announcing system as claimed in claim 7, wherein the feature image comparison unit is configured to compare the differences between the features of the vehicle image captured by the image capturing unit when the probable collision event occurs and the standard vehicle image.

9. The vehicle collision event announcing system as claimed in claim 2, further comprising:

a user interface, coupled to the processor, configured to send an inquiry message to a user after the collision sensing unit detects the real collision event and before the communication unit announces the real collision event message, to confirm if the real collision event message should be announced.

10. The vehicle collision event announcing system as claimed in claim 9, wherein the user interface further comprises an output module and an input module, wherein the output module is configured to display the inquiry message, and the input module is configured to receive a confirmation message input by the user.

11. The vehicle collision event announcing system as claimed in claim 9, configured such that when the user fails to confirm the inquiry message within a predetermined time, the communication unit automatically announces the real collision event message.

12. The vehicle collision event announcing system as claimed in claim 1, wherein the vehicle collision event announcing system is configured in a mobile communication device.

13. The vehicle collision event announcing system as claimed in claim 1, wherein the collision sensing unit is an accelerometer or a gravity sensor.

14. A vehicle collision event announcing system, comprising:

a near-end portion, comprising:

a first processor;

an image capturing unit, coupled to the first processor, configured to capture images from at least a part of a vehicle; and a collision sensing unit, configured to detect a probable collision event involving the vehicle; and a far-end portion, wirelessly coupled to the near-end portion, comprising:

a second processor; and a feature image comparison unit, coupled to the second processor, configured to compare an image captured before the probable collision event and an image captured after the probable collision event in response to detection of the probable collision event by the collision sensing unit, and to determine accordingly whether the probable collision event is a real collision event in which damage comprising deformation is caused to the vehicle.

15. A vehicle collision event announcing method, comprising:

capturing images from at least a part of a vehicle by an image capturing unit;

detecting a probable collision event involving the vehicle by a collision sensing unit;

comparing, by a feature image comparison unit in response to the probable collision event detected by the collision sensing unit, an image captured before the probable collision event and an image captured after the probable collision event, and determining accordingly whether the probable collision event is a real collision event in which damage comprising deformation is caused to the vehicle.

16. The vehicle collision event announcing method as claimed in claim 15, further comprising:

when determining that the probable collision event is a real collision event and/or the seriousness of the damage reaches a predetermined value, announcing a far-end real collision event message.

17. The vehicle collision event announcing method as claimed in claim 16, wherein the real collision event message comprises the GPS coordinates indicating where the real collision event occurred.

18. The vehicle collision event announcing method as claimed in claim 16, further comprising:

sending an inquiry message to a user after the collision sensing unit detects the real collision event and before the communication unit announces the real collision event message, to confirm if the real collision event message should be announced;

if the user confirms with yes, announcing the real collision event message; and if the user answers with no, canceling or suspending the announcement of the real collision event message.

19. The vehicle collision event announcing method as claimed in claim 18, further comprising:

when the user fails to confirm the inquiry message within a predetermined time, announcing the real collision event message.

20. The vehicle collision event announcing method as claimed in claim 15, further comprising:

capturing a vehicle image of at least a part of the vehicle as a standard vehicle image before the collision sensing unit detects the probable collision event; and comparing the difference between the features of the vehicle image at the time when the probable collision event occurs and the standard vehicle image.

* * * * *